US008470285B1

(12) United States Patent
Lu et al.

(10) Patent No.: US 8,470,285 B1
(45) Date of Patent: Jun. 25, 2013

(54) METHOD OF LIQUID PHASE SYNTHESIS OF CARBON NANOTUBES IN AIR

(75) Inventors: Ryan P. Lu, San Diego, CA (US); Christopher K. Huynh, Rosemead, CA (US); Ayax D. Rammirez, Chula Vista, CA (US); Debjyoti Banerjee, College Station, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/439,055

(22) Filed: Apr. 4, 2012

(51) Int. Cl.
*D01C 5/00* (2006.01)
(52) U.S. Cl.
USPC ............ 423/447.3; 423/447.1; 977/742; 977/842
(58) Field of Classification Search
USPC ............ 423/447.1, 447.3; 977/742, 842
See application file for complete search history.

(56) References Cited

U.S. PATENT DOCUMENTS

| 4,663,230 A | 5/1987 | Tennent |
| 5,578,543 A | 11/1996 | Tennent |
| 5,707,916 A | 1/1998 | Snyder |
| 6,683,783 B1 | 1/2004 | Liu |
| 7,125,502 B2 | 10/2006 | Smalley |
| 7,335,395 B2 | 2/2008 | Ward |
| 2005/0287064 A1* | 12/2005 | Mayne et al. ............ 423/445 B |
| 2010/0193747 A1* | 8/2010 | Kajiura et al. ............ 252/502 |

OTHER PUBLICATIONS

Li, E., et al. "Air-assisted growth of ultra-long carbon nanotube bundles" Nanotechnology 19 (2008).*
Cheng, H.M. et al; "Bulk Morphology and Diameter Distribution of Single-Walled Carbon Nanotubes Synthesized by Catalytic Decomposition of Hydrocarbons"; Chemical Physics Letters 289 (1998) 602-610.
Cheng, H.M. et al; "Large-Scale and Low-Cost Synthesis of Single-Walled Carbon Nanotubes by the Catalytic Pyrolysis of Hydrocarbons"; Applied Physics Letters vol. 72, No. 25 (Jun. 22, 1998); 3282-3284.
Dai, H.; Single-Wall Nanotubes Produced by Metal-Catalyzed Disproportionation of Carbon Monoxide: Chemical Physics Letters 260 (1996) 471-475.
Thess, A. et al; "Crystalline Ropes of Metallic Carbon Nanotubes" ; Science Jul. 26, 1996; vol. 273 No. 5274 pp. 483-487 DOI: 10.1126/science.273.5274.483.

(Continued)

*Primary Examiner* — Stuart Hendrickson
*Assistant Examiner* — Richard M Rump
(74) *Attorney, Agent, or Firm* — Kyle Eppele; Stephen E. Baldwin

(57) ABSTRACT

A method of liquid phase synthesis of carbon nanotubes in air comprising the steps of making a first liquid phase metal salt catalyst solution of a first predetermined volume; making a carbon source liquid phase solution of a second predetermined volume; ultrasonicating the first metal salt catalyst and the carbon source solutions to de-agglomerate and uniformly disperse their powder form into the solutions; depositing predetermined volumes of droplets of the first metal salt catalyst and the carbon source solutions onto a substrate; drying the first metal salt catalyst and the carbon source solutions on the substrate in an air environment for a predetermined time to form a carbon and catalyst composite; and heating the carbon and catalyst mixture in the air environment for a predetermined temperature and time to form one or more carbon nanotubes.

15 Claims, 5 Drawing Sheets

OTHER PUBLICATIONS

Li, W.Z. et al; "Large-Scale Synthesis of Aligned Carbon Nanotubes"; Science Dec. 6, 1996: vol. 274 No. 5293 pp. 1701-1703; I:10.1126/science.274.5293.1701.

Ivanov, V. et al., "The Study of Carbon Nanotubules Produced by Catalytic Method"; Chem. Phys. Lett, 223:329, 1994; pp. 329-335.

Rinzler, A. G. et al., "Large-Scale Purification of Single-Wall Carbon Nanotubes: Process, Product and Characterization"; Appl. Phys. A., 67: pp. 29-37, 1998.

Journet, C. et al; "Large-Scale Production of Single-Walled Carbon Nanotubes by the Electric-Arc Technique"; Nature ;vol. 388; Aug. 21, 1997; 756-758.

* cited by examiner

METHOD OF LIQUID PHASE SYNTHESIS OF CARBON NANOTUBES IN AIR

FEDERALLY-SPONSORED RESEARCH AND DEVELOPMENT

This invention (Navy Case NC 101,142) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

BACKGROUND OF THE INVENTION

Carbon nanotubes (CNT) are seamless tubes of graphite sheets with full fullerene caps which were first discovered as multilayer concentric tubes or multi-walled carbon nanotubes and subsequently as single-walled carbon nanotubes in the presence of transition metal catalysts. Carbon nanotubes have shown promising applications including nanoscale electronic devices, high strength materials, electron field emission, tips for scanning probe microscopy, and gas storage.

Generally, single-walled carbon nanotubes are preferred over multi-walled carbon nanotubes for use in these applications because they have fewer defects and are therefore stronger and more conductive than multi-walled carbon nanotubes of similar diameter. Defects are less likely to occur in single-walled carbon nanotubes than in multi-walled carbon nanotubes because multi-walled carbon nanotubes can survive occasional defects by forming bridges between unsaturated carbon valances, while single-walled carbon nanotubes have no neighboring walls to compensate for defects.

However, the availability of these new single-walled carbon nanotubes in quantities necessary for practical technology is still problematic. Large scale processes for the production of high quality single-walled carbon nanotubes are still needed.

Presently, there are three main approaches for synthesis of carbon nanotubes. These include the laser ablation of carbon (Thess, A. et al., Science, 273:483, 1996), the electric arc discharge of graphite rod (Journet, C. et al., Nature, 388:756, 1997), and the chemical vapor deposition (CVD) of hydrocarbons (Ivanov, V. et al., Chem. Phys. Lett, 223:329, 1994; Li A. et al., Science, 274:1701, 1996). The production of multi-walled carbon nanotubes by catalytic hydrocarbon cracking is now on a commercial scale (U.S. Pat. No. 5,578,543) while the production of single-walled carbon nanotubes is still in a gram scale by laser (Rinzier, A. G. et al., Appl. Phys. A., 67:29, 1998) and arc (Journet, C. et al., Nature, 388:756, 1997) techniques.

Unlike the laser and arc techniques, carbon vapor deposition over transition metal catalysts tends to create multi-walled carbon nanotubes as a main product instead of single-walled carbon nanotubes. However, there has been some success in producing single-walled carbon nanotubes from the catalytic hydrocarbon cracking process. Dai et al. (Dai, H. et al., Chem. Phys. Lett, 260:471 1996) demonstrated the formation of a web-like single-walled carbon nanotube structures resulting from using carbon monoxide (CO) with a molybdenum (Mo) catalyst that was supported on alumina coated substrate and heated to 1200 deg C. From the electron microscope images reported in this study, the Mo metal was observed to attach to nanotubes at their tips.

The diameter of single-walled carbon nanotubes is generally reported to vary from 1 nm to 5 nm and seems to be controlled by the Mo particle size. Catalysts containing iron, cobalt or nickel have been used at temperatures between 850 deg C. to 1200.degree. C. in a chemical vapor deposition chamber filled with carbon based gases to form multi-walled carbon nanotubes (U.S. Pat. No. 4,663,230). Recently, rope-like bundles of single-walled carbon nanotubes were generated from the thermal cracking of benzene with iron catalyst and sulfur additive at temperatures between 1100-1200 deg C. (Cheng, H. M. et al., Appl. Phys. Lett., 72:3282, 1998; Cheng, H. M. et al., Chem. Phys. Lett., 289:602, 1998).

The synthesized single-walled carbon nanotubes are roughly aligned in bundles and woven together similarly to those obtained from laser vaporization or electric arc method. The use of laser targets comprising one or more Group VI or Group VIII transition metals to form single-walled carbon nanotubes has been proposed (U.S. Pat. No. 6,683,783 (WO98/39250). The use of metal catalysts comprising iron and at least one element chosen from Group V (V, Nb and Ta), VI (Cr, Mo and W), VII (Mn, Tc and Re) or the lanthanides has also been proposed (U.S. Pat. No. 5,707,916). However, methods using these catalysts are used in CVD chambers filled with Carbon based gases and have not been shown to produce quantities of nanotubes having a high ratio of single-walled carbon nanotubes to multi-walled carbon nanotubes. Moreover, metal catalysts are an expensive component of the production process.

In addition, the separation steps which precede or follow the reaction step represent a large portion of the capital and operating costs required for production of the carbon nanotubes. Therefore, the purification of single-walled carbon nanotubes from multi-walled carbon nanotubes and contaminants (i.e., amorphous and graphitic carbon) may be substantially more time consuming and expensive than the actual production of the carbon nanotubes.

Therefore, new and improved methods of producing nanotubes which enable synthesis of bulk quantities of substantially pure single-walled carbon nanotubes at reduced costs are sought. It is to such methods and apparatus for producing nanotubes that the present invention is directed.

SUMMARY OF THE INVENTION

The present invention provides a method of liquid phase synthesis of carbon nanotubes in air. In one preferred embodiment, the method for synthesizing carbon nanotubes comprises the steps of making a first liquid phase metal salt catalyst solution of a first predetermined volume; making a second, different liquid phase metal salt catalyst solution of a second predetermined volume; making a carbon source liquid phase solution of a third predetermined volume; ultrasonicating the first metal salt catalyst, the second metal catalyst, and the carbon source solutions to de-agglomerate and uniformly disperse their powder form into the solutions; depositing predetermined volumes of droplets of the first metal salt catalyst, the second metal salt catalyst, and the carbon source solutions onto a substrate; drying the first metal salt catalyst, the second metal salt catalyst, and the carbon source solutions on the substrate in an air environment for a predetermined time to form a carbon and catalyst composite; and annealing the carbon and catalyst composite in the air environment for a predetermined temperature and time to form carbon nanotubes.

BRIEF DESCRIPTION OF THE DRAWINGS

The invention will be more fully described in connection with the annexed drawings, where like reference numerals designate like components, in which.

DETAILED DESCRIPTION OF THE PREFERRED EMBODIMENTS

Figure 1:
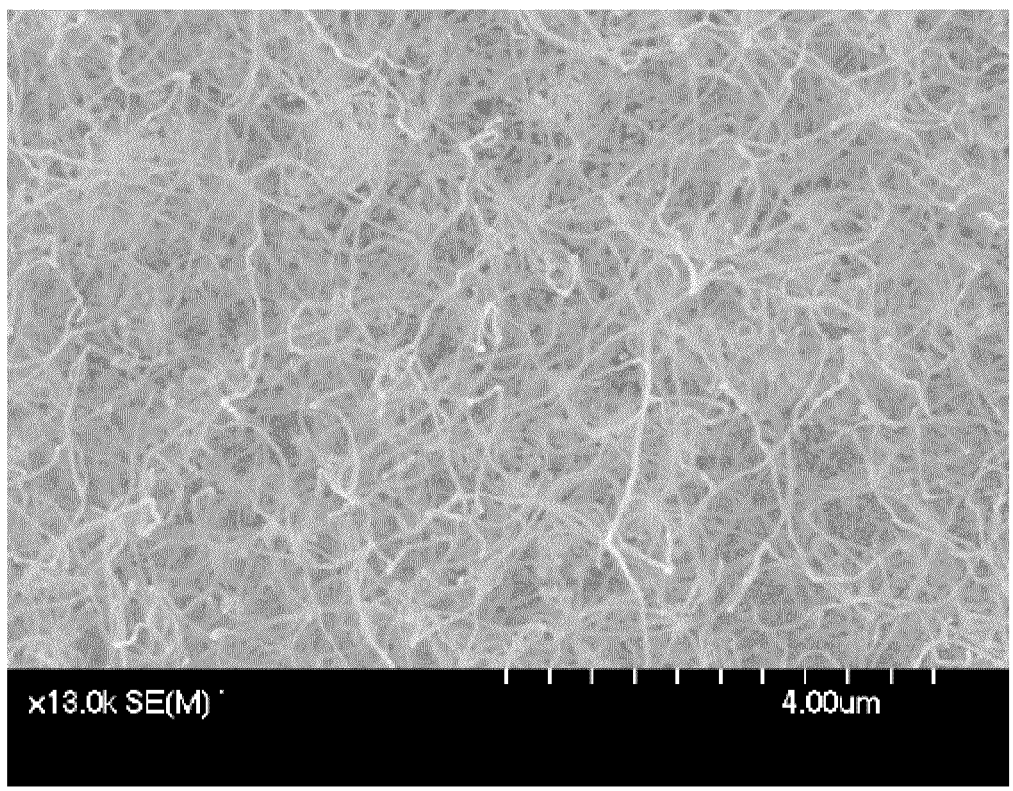
FIG. 1 shows an image of resulting carbon nanotube grown in accordance with the present invention.

In one preferred embodiment, the present invention is a method to synthesize carbon nanotubes (CNTs) in air using one or more types of metal salts in different proportions of mass in a mixture—which serve as catalysts. One or more types of carbon materials can act as organic source for the synthesis of CNT in air or under ambient conditions. The raw materials required for the synthesis of CNT are the catalyst materials and the carbon source materials (organic materials). For the synthesis of CNT, the metal salt catalysts and the carbon source (organic source materials) can be used as bulk mixtures or can be used as thin film coatings on variety of substrates. The thin film coatings can be applied by various techniques. One embodiment to realize the thin films of the raw materials is to deposit liquid solutions of the raw materials on a surface and evaporating the solvent from the solution. Other conventional techniques include Physical Vapor Deposition, Ablation Vapor Deposition and Chemical Vapor Deposition.

The CNT synthesis conditions can be modified to include inert atmospheres. The synthesis conditions can also be modified to include partial vacuum pressures or higher pressures than the ambient. The synthesis condition can be achieved by using an electrical heater or other sources of heat such as by illuminating with laser or optical sources. Alternate arrangements for heating include chemical sources, open flames, indirect heating from electro-magnetic radiation, electrical induction heating, magnetic induction heating and thermonuclear sources.

In general, CNTs have extraordinary electrical and mechanical material properties such as being 312 times stronger yet 6 times less dense than high carbon steel and 1000 times greater current carrying capacity as well as much better thermal conductivity compared to copper. As requirements for improved size, weight and power (SWaP) become stricter for DoD systems, the need for advanced materials become important technological issues. There is a corresponding need for advanced materials in the commercial world as well.

The inventive process described herein, in the most general embodiment, is a method to grow carbon nanotubes in air.

In one preferred embodiment, the novelty of the herein disclosed invention is the use of a metal containing salt such as palladium chloride or platinum chloride and a carbon source such as $C_{60}$.

In that preferred embodiment, a first solution is made by adding 1 ml of de-ionized or distilled water with the 2.5 mg of $PdCl_2$ metal salt powder. Preferably, 0.1 ml of 10 molar HCl acid is added to this first solution.

A second solution is prepared, identical in volume, using 2.5 mg PtCl2 powder.

A third solution of the same volume is made comprised of 2.5 mg $C_{60}$ powder and 1 ml of toluene.

All three solutions are then ultrasonicated for 30 minutes.

In this preferred embodiment, a 1 cm×1 cm silicon wafer is used a substrate. In this embodiment, 0.1 ml droplets of the 3 solutions are placed on the silicon substrate in the order of 2 drops of $C_{60}$ solution, 1 drop of $PdCl_2$ solution and 1 drop of $PtCl_2$ solution.

In a second embodiment, the 0.1 ml droplets of the 3 solutions are placed on the silicon substrate in the order of 1 drop of PdCl2 solution 1 drop of $PtCl_2$ solution and 2 drops of $C_{60}$ solution.

The samples are allowed to dry in air or on a hotplate set to 80 deg C.

Subsequent to the drying process, the samples are loaded into a rapid thermal annealing system which ramps the temperature near instantaneously to 700 deg C. for 30 minutes in an environment filled with air.

Finally, the sample is cooled at approximately 0.5 degrees C. per second.

FIG. 1 shows an image of the resulting carbon nanotube growth at 700 deg Celsius from $C_{60}$+$PdCl_2$+$PtCl_2$ solution on a silicon substrate. The image was acquired from a Hitachi S4700 scanning electron microscope at 13,000× magnification.

Figure 2:
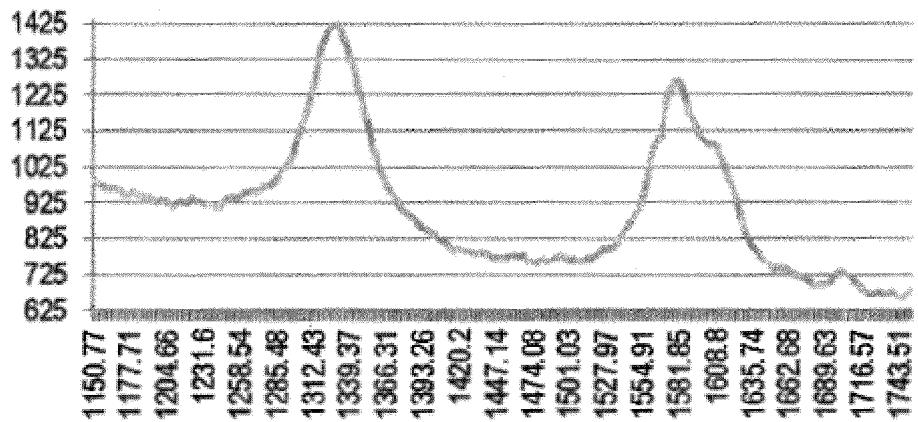
FIG. 2 shows a Raman spectra of the carbon nanotube sample shown in FIG. 1.

FIG. 2 shows a Raman spectra of the carbon nanotube growth. In the analysis of Raman spectra for CNTs and graphene, the two most important frequencies are called G band and D band (also known as G' band). Also, there is a low frequency band known as radial breathing mode (RBM) which is characteristic of CNTs. While the G band occurs at $1580$ $cm^{-1}$ the D band is usually seen around $1300$ $cm^{-1}$ for CNTs. The RBM mode around $200$ $cm^{-1}$ confirms the presence of CNTs in a material. In the case of graphene, the G band occurs at $1580$ $cm^{-1}$ but the D band is usually seen around $2670$ $cm^{-1}$.

Figure 3:
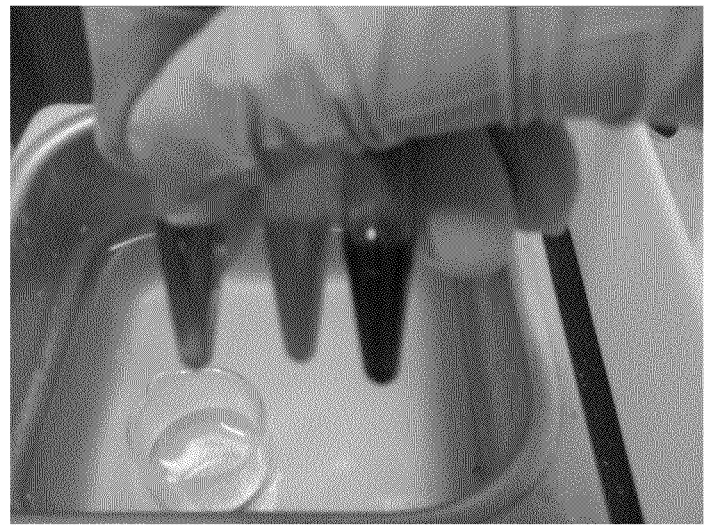
FIG. 3 shows a view where Pd—Cl2 metal salt catalyst in solution, PtCl2 metal salt catalyst in solution and $C_{60}$ in solution are prepared in Eppendorf test tubes.

FIG. 3 shows a view where Pd—Cl2 metal salt catalyst in solution, PtCl2 metal salt catalyst in solution and $C_{60}$ in solution are prepared in Eppendorf test tubes.

Figure 4:
FIG. 4 shows a view where the Eppendorf test tubes are placed into a beaker and into an ultrasonic bath.

FIG. 4 shows a view where the Eppendorf test tubes are placed into a beaker and into an ultrasonic bath. In one embodiment, the tubes are ultrasonicated for 30 minutes.

Figure 5:
FIG. 5 shows a view where a pipette or syringe is used to extract droplets from the Eppendorf tubes.

FIG. 5 shows a view where a pipette or syringe is used to extract droplets from the Eppendorf tubes. In one embodiment, two drops of the $C_{60}$ solution are placed on a silicon substrate and allowed to air dry. One drop of PdCl2 metal salt catalyst solution is placed on top of the $C_{60}$ layer and allowed to air dry. One drop of PtCl2 metal salt catalyst solution is placed top of the PdCl2 layer.

Figure 6:
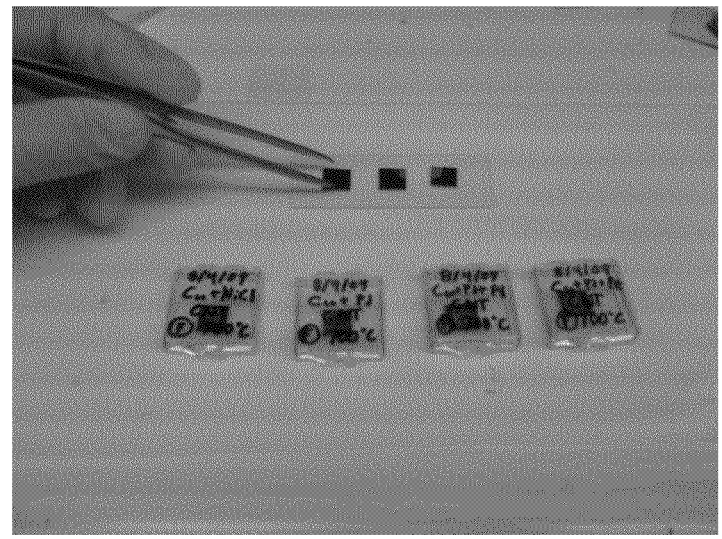
FIG. 6 shows a view where the use of larger silicon substrates can be used.

FIG. 6 shows a view where the use of larger silicon substrates can be used.

Figure 7:
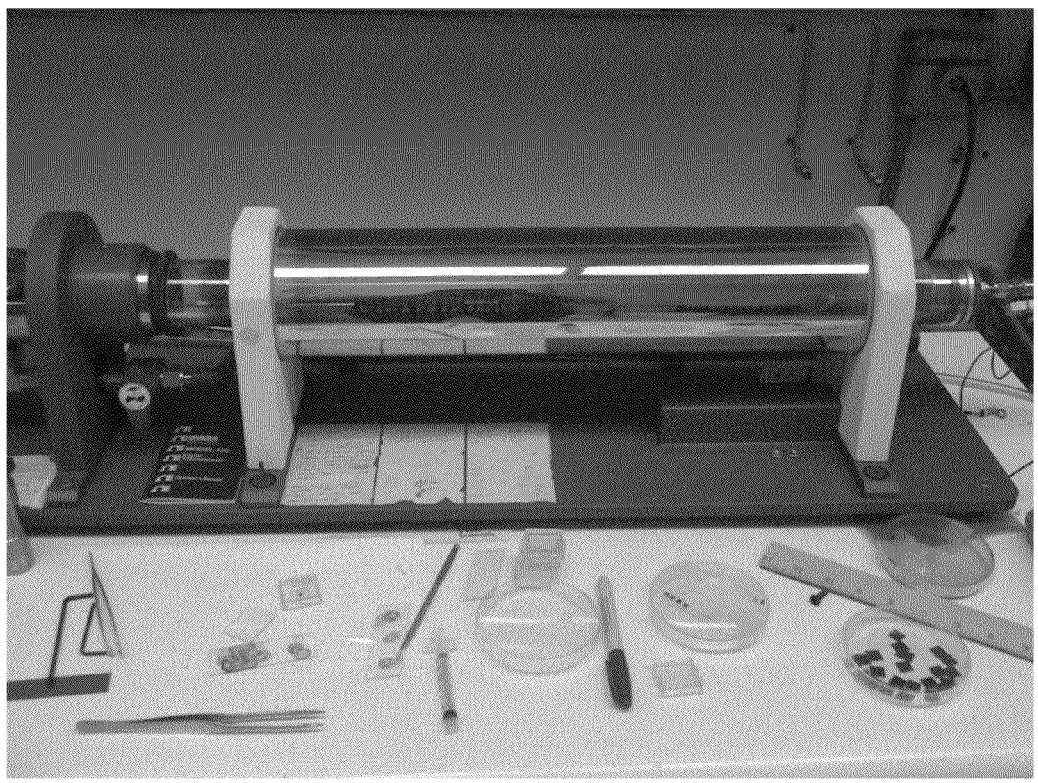
FIG. 7 shows a view of a rapid thermal annealer.

FIG. 7 shows a view of a rapid thermal annealer. The rapid thermal annealing tube is preheated to 700 C. The silicon substrate containing the layers of $C_{60}$, PdCl2 and PtCl2 is placed in the opening on a forked substrate holder found in the opening on the left side of the tube. The forked substrate holder manually slides to the center of the tube where the temperature is measured by a thermocouple.

This invention provides a novel method for growth of CNTs in air using metal salt catalysts. There are no other reports of CNT growth in air using this method. Other methods that use metal salt catalysts are done in a chemical vapor deposition chamber which limits the area of CNT growth to the size of the chamber. This inventive technique enables large area growth of CNTs which can be any size as long as the sample can be heated to the required temperature.

This invention can use other known transition metal salt catalysts such as Ni, Fe and Co. Alternatively, the number of droplets of $C_{60}$ and metal salt solutions can vary but maintaining the same ratio or a different ratio. A second alternative is the varying of $C_{60}$ powder and metal salt powder maintaining the same ratio. A third alternative is the varying of droplet order, where an alternating droplet order is possible such as $C_{60}$, $PdCl_2$, $C_{60}$, $PtCl_2$ or $C_{60}$, $PtCl_2$, $C_{60}$, $PdCl_2$ or $PdCl_2$, $C_{60}$, $PtCl_2$, $C_{60}$ or $PtCl_2$, $C_{60}$, $PdCl_2$, $C_{60}$ or any other combination of the droplet order of the three solutions. A fourth alternative is this use of any other substrate that can withstand the growth temperature of 700 deg C. such as alumina, carbon, silicate, quartz, sapphire, alumina silicate, or silicon nitride. A fifth alternative is to use transition metal nanoparticles instead of metal salt solutions. The metal salt solutions can be in the same ratio or different ratio. The metal salt solutions can be dispensed on to a surface in the same order or a different order.

In one preferred embodiment, the present invention provides a method for synthesizing carbon nanotubes comprising the steps of:

making a first liquid phase metal salt catalyst solution of a first predetermined volume;

making a second, different liquid phase metal salt catalyst solution of a second predetermined volume;

making a carbon source liquid phase solution of a third predetermined volume;

ultrasonicating the first metal salt catalyst, the second metal catalyst, and the carbon source solutions to de-agglomerate and uniformly disperse their powder form into the solutions;

depositing predetermined volumes of droplets of the first metal salt catalyst, the second metal salt catalyst, and the carbon source solutions onto a substrate;

drying the first metal salt catalyst, the second metal salt catalyst, and the carbon source solutions on the substrate in an air environment for a predetermined time to form a carbon and catalyst composite; and annealing the carbon and catalyst composite in the air environment for a predetermined temperature and time to melt the metal salt catalyst particulates and absorbing the carbon source until the catalyst is saturated and the carbon precipitates from under the catalyst in the form of one or more carbon nanotubes.

In another preferred embodiment, the method of synthesizing carbon nanotubes can be achieved with only a first liquid phase metal salt catalyst solution and a carbon source liquid phase solution. In this embodiment, the present invention provides a method for synthesizing carbon nanotubes comprising the steps of:

making a first liquid phase metal salt catalyst solution of a first predetermined volume;

making a carbon source liquid phase solution of a second predetermined volume;

ultrasonicating the first metal salt catalyst and the carbon source solutions to de-agglomerate and uniformly disperse their powder form into the solutions;

depositing predetermined volumes of droplets of the first metal salt catalyst and the carbon source solutions onto a substrate;

drying the first metal salt catalyst and the carbon source solutions on the substrate in an air environment for a predetermined time to form a carbon and catalyst mixture; and heating the carbon and catalyst mixture in the air environment for a predetermined temperature and time to form one or more carbon nanotubes.

From the above description, it is apparent that various techniques may be used for implementing the concepts of the present invention without departing from its scope. For instance, it is apparent that the method could be automated in order to form the carbon nanotubes. The described embodiments are to be considered in all respects as illustrative and not restrictive. It should also be understood that the present invention is not limited to the particular embodiments described herein, but is capable of many embodiments without departing from the scope of the claims.

What is claimed is:

1. A method for synthesizing carbon nanotubes comprising:

making a first liquid phase metal salt powder catalyst solution of a first volume;

making a second, different liquid phase metal salt powder catalyst solution of a second volume;

making a $C_{60}$ carbon source liquid phase powder solution of a third volume resulting in respective first metal salt powder catalyst, second metal salt powder catalyst, and $C_{60}$ carbon source powder solutions;

ultrasonicating the first metal salt catalyst, the second metal catalyst, and the $C_{60}$ carbon source solutions to de-agglomerate and uniformly disperse their respective powder form into the respective solutions to form a first dispersed solution, a second dispersed solution and a carbon source dispersed solution;

depositing predetermined volumes of droplets of the first dispersed solution, the second dispersed solution, and the carbon source dispersed solution onto a substrate;

drying the first dispersed solution, the second dispersed solution, and the carbon source dispersed solution on the substrate in an air environment for a predetermined time to form a carbon and catalyst mixture; and heating the carbon and catalyst mixture in the air environment for a predetermined temperature and time resulting in the growth of one or more carbon nanotubes.

2. The method of claim 1 wherein the carbon nanotubes are single walled.

3. The method of claim 2 wherein the ratios and volumes of the first, second and third solutions are approximately equal.

4. The method of claim 1 wherein the first metal salt is palladium chloride.

5. The method of claim 4 wherein the second metal salt is platinum chloride.

6. A method for synthesizing carbon nanotubes comprising:

making a first liquid phase metal salt powder catalyst solution of a first volume;

making a $C_{60}$ carbon source liquid phase powder solution of a second predetermined volume resulting in respective first metal salt powder catalyst and $C_{60}$ carbon source powder solutions;

ultrasonicating the first metal salt catalyst and the carbon source solutions to de-agglomerate and uniformly disperse their respective powder form into the respective solutions to form a first dispersed solution and a carbon source dispersed solution;

depositing predetermined volumes of droplets of the first dispersed solution and the carbon source dispersed solution onto a substrate;

drying the first dispersed solution and the carbon source dispersed solution on the substrate in an air environment for a predetermined time to form a carbon and catalyst mixture; and heating the carbon and catalyst mixture in the air environment for a predetermined temperature and time resulting in the growth of one or more carbon nanotubes.

7. The method of claim 6 wherein the carbon nanotubes are single walled.

8. The method of claim 7 wherein the ratios and volumes of the first and second solutions are approximately equal.

9. The method of claim 6 wherein the first metal salt is palladium chloride.

10. The method of claim 6 wherein the first metal salt is platinum chloride.

11. The method of claim 6 wherein the first metal salt contains a metal from the transition metal group.

12. The method of claim 6 wherein the heating source can be electrical heating, induction heating, combustion heating, direct or indirect flame heating source, and laser or optical or electro-magnetic radiation heating source.

13. The method of claim 6 wherein the heating can be performed in air or under ambient conditions, or in the presence of inert gases or in reduced pressure vacuum environment or in elevated pressure environment.

14. A method for synthesizing carbon nanotubes comprising the steps of:
  making a first liquid phase metal salt powder catalyst solution of a first volume;
  making a second, different liquid phase metal salt powder catalyst solution of a second volume;
  making a $C_{60}$ carbon source liquid phase powder solution of a third volume resulting in respective first metal salt powder catalyst, second metal salt powder catalyst, and $C_{60}$ carbon source powder solutions;
  ultrasonicating the first catalyst solution, the second catalyst solution, and the carbon source powder solution to de-agglomerate and uniformly disperse the respective powders into the respective solutions to form a first dispersed solution, a second dispersed solution and a carbon source dispersed solution;
  depositing predetermined volumes of droplets of the first dispersed solution, the second dispersed solution, and the carbon source dispersed solution onto a substrate;
  drying the first dispersed solution, the second dispersed solution, and the carbon source dispersed solution on the substrate in an air environment for a predetermined time to form a carbon and catalyst composite having metal salt catalyst particulates; and
  annealing the carbon and catalyst composite in the air environment for a predetermined temperature and time to melt the metal salt catalyst particulates and absorb the carbon source until the catalyst composite is saturated and carbon precipitates from under the catalyst composite resulting in the growth of one or more carbon nanotubes.

15. A method for synthesizing carbon nanotubes comprising the steps of:
  making a first liquid phase metal salt powder catalyst solution of a first volume;
  making a $C_{60}$ carbon source liquid phase powder solution of a second volume resulting in respective first metal salt powder catalyst and $C_{60}$ carbon source powder solutions;
  ultrasonicating the first catalyst solution and the $C_{60}$ carbon source powder solution to de-agglomerate and uniformly disperse the respective powders into the respective solutions to form a first dispersed solution and a carbon source dispersed solution;
  depositing predetermined volumes of droplets of the first dispersed solution and the carbon source dispersed solution onto a substrate;
  drying the first dispersed solution and the carbon source dispersed solution on the substrate in an air environment for a predetermined time to form a carbon and catalyst composite having metal salt catalyst particulates; and
  annealing the carbon and catalyst composite in the air environment for a predetermined temperature and time to melt the metal salt catalyst particulates and absorb the carbon source until the catalyst composite is saturated and carbon precipitates from under the catalyst composite resulting in the growth of one or more carbon nanotubes.

* * * * *

UNITED STATES PATENT AND TRADEMARK OFFICE
CERTIFICATE OF CORRECTION

| | | |
|---|---|---|
| PATENT NO. | : 8,470,285 B1 | Page 1 of 1 |
| APPLICATION NO. | : 13/439055 | |
| DATED | : June 25, 2013 | |
| INVENTOR(S) | : Ryan P. Lu et al. | |

It is certified that error appears in the above-identified patent and that said Letters Patent is hereby corrected as shown below:

On the Title Page, Item (75), the correct spelling of the third named inventor of US Patent No. 8,470,285 B1 should read -- Ayax D. Ramirez --

Signed and Sealed this

Tenth Day of December, 2013

Margaret A. Focarino
*Commissioner for Patents of the United States Patent and Trademark Office*